(12) United States Patent
Grassle (10) Patent No.: US 6,785,824 B1
(45) Date of Patent: Aug. 31, 2004

(54) SYSTEM FOR CHARACTER-CHILD INTERACTION WITH ADULT CHARACTER CONTROL

(76) Inventor: Geoffrey J. Grassle, c/o Initio, 212 N. Third Ave., Suite 510, Minneapolis, MN (US) 55401

( * ) Notice: Subject to any disclaimer, the term of this patent is extended or adjusted under 35 U.S.C. 154(b) by 0 days.

(21) Appl. No.: 09/389,560

(22) Filed: Sep. 3, 1999

(51) Int. Cl.[7] .............................. H04L 9/32; G09G 5/00
(52) U.S. Cl. ...................... 713/202; 345/753; 709/204
(58) Field of Search ................................ 709/223, 234, 709/204–207; 713/200–202; 345/700, 751–753

(56) References Cited

U.S. PATENT DOCUMENTS

| | | | |
|---|---|---|---|
| 5,727,950 A | | 3/1998 | Cook et al. |
| 5,743,746 A | | 4/1998 | Ho et al. |
| 5,746,602 A | | 5/1998 | Kikinis |
| 5,764,889 A | | 6/1998 | Ault et al. |
| 5,802,296 A | | 9/1998 | Morse et al. |
| 5,835,722 A | | 11/1998 | Bradshaw et al. |
| 5,884,029 A | | 3/1999 | Brush, II et al. |
| 5,907,831 A | | 5/1999 | Lotvin et al. |
| 6,065,056 A | * | 5/2000 | Bradshaw et al. .......... 709/229 |
| 6,073,105 A | * | 6/2000 | Sutcliffe et al. ............... 705/1 |

OTHER PUBLICATIONS

"Netscape and SafeSurf team up to protect children online" Jun. 17, 1998, web.archive.org/web/19981206113906/safe-surf.com/press24.html, p. 1–2.*
"Internet access: Net Nanny and SafeSurf merge technologies" Feb. 24, 1997, Work–Group Computer Report, vol. 8, p. 25 via Dialog Text Search, p. 25.*
Fryer et al, "Microsoft Press Computer Dictionary" 1997, Microsoft Press, 3rd Edition, p. 119.*

* cited by examiner

Primary Examiner—Ayaz Sheikh
Assistant Examiner—Christopher Revak
(74) Attorney, Agent, or Firm—Patterson, Thuente, Skaar & Christensen, P.A.

(57) ABSTRACT

The system of the present invention generally allows a first user, the adult, to interact in the manner of a character facade with a second user, the child, via computer connections to a webserver. The webserver generally includes a processor with a memory/storage device that holds a character interaction program which supports a registration website and a character website. The processor operates with the program to receive a message from the child user, to notify the adult user of the received message via electronic mail, to receive a reply from the adult user, and to present the reply to the child user as though coming from a character rather than the adult user.

24 Claims, 10 Drawing Sheets

Fig. 10

SYSTEM FOR CHARACTER-CHILD INTERACTION WITH ADULT CHARACTER CONTROL

FIELD OF THE INVENTION

The present invention relates to systems enabling remote parent-child interaction, and more particularly, to a secure method for allowing parents to interact with their children anonymously using the internet and world wide web as a tool.

BACKGROUND OF THE INVENTION

The growing popularity of the internet increases a parent's desire to locate safe and fun websites for their children's use. Parents naturally want to prevent their children from using websites that link to undesirable content (pornography, violence, etc.). Likewise, parents also wish to prevent their children from interacting with strangers in an online chat room or discussion group.

Previous attempts to limit children's access to the internet have mostly involved software programs like Surfwatch or Net Nanny. These programs have allowed a child to freely browse the world wide web, but have blocked access to prohibited websites that are listed in prohibited site libraries that are updated periodically. This method works adequately for screening undesirable content, but does nothing to provide high quality, safe websites for children.

Websites that provide interesting interactive features like chat rooms or discussion groups have been notoriously insecure environments. Children who locate one of these websites may find themselves chatting with older children or adults who may take advantage of their vulnerability. Some of these chat rooms are moderated, e.g. America Online offers moderated chatrooms for children. However, many parents are still likely to feel uncomfortable allowing their young children to access such sites. While online conversations are interesting and educational, there is currently no safe way for parents to monitor and participate in these interactions.

In view of the above, there is a need for a safe "destination" for children that can provide a variety of high-quality entertainment and educational content while allowing the parent to anonymously be involved in customizing the internet experience for their child.

SUMMARY OF THE INVENTION

The needs above are in large measure met by the system for character-child interaction with adult character control of the present invention. The system generally allows a first user, the adult, to interact in the manner of a character facade with a second user, the child, via computer connections to a webserver. The webserver generally includes a processor with a memory/storage device that holds a character interaction program which supports a registration website and a character website. The processor operates with the program to receive a message from the child user, to notify the adult user of the received message via electronic mail, to receive a reply from the adult user, and to present the reply to the child user as though coming from a character rather than the adult user.

The system further allows the adult user to register and enter personal information about the child user which can then be utilized by the character in interacting with the child user. Additionally, the system implements various measures of security. For instance, both the adult and child user must enter some type of login, password, or other type of serial identification, which is checked against valid identifications, to obtain access to the registration and character websites. Further, upon initial log-in and/or registration the webserver writes a cookie file to the user's hard drive. Upon a second entry to the websites, the webserver verifies, by checking the cookie file, that the user is entering the website from the same computer used for initial log-in and/or registration. If not, access is denied.

A method of the present invention provides for a computer facilitating the interaction of an adult user with a child user in the manner of a character facade by utilizing the following steps: (1) allowing the child user to input a message into the computer; (2) notifying the adult user of the input message; (3) allowing the adult user to input into the computer a reply to the message; and (4) the computer displaying the reply to the child user as though coming from a character.

DETAILED DESCRIPTION OF THE PREFERRED EMBODIMENTS

Figure 1:
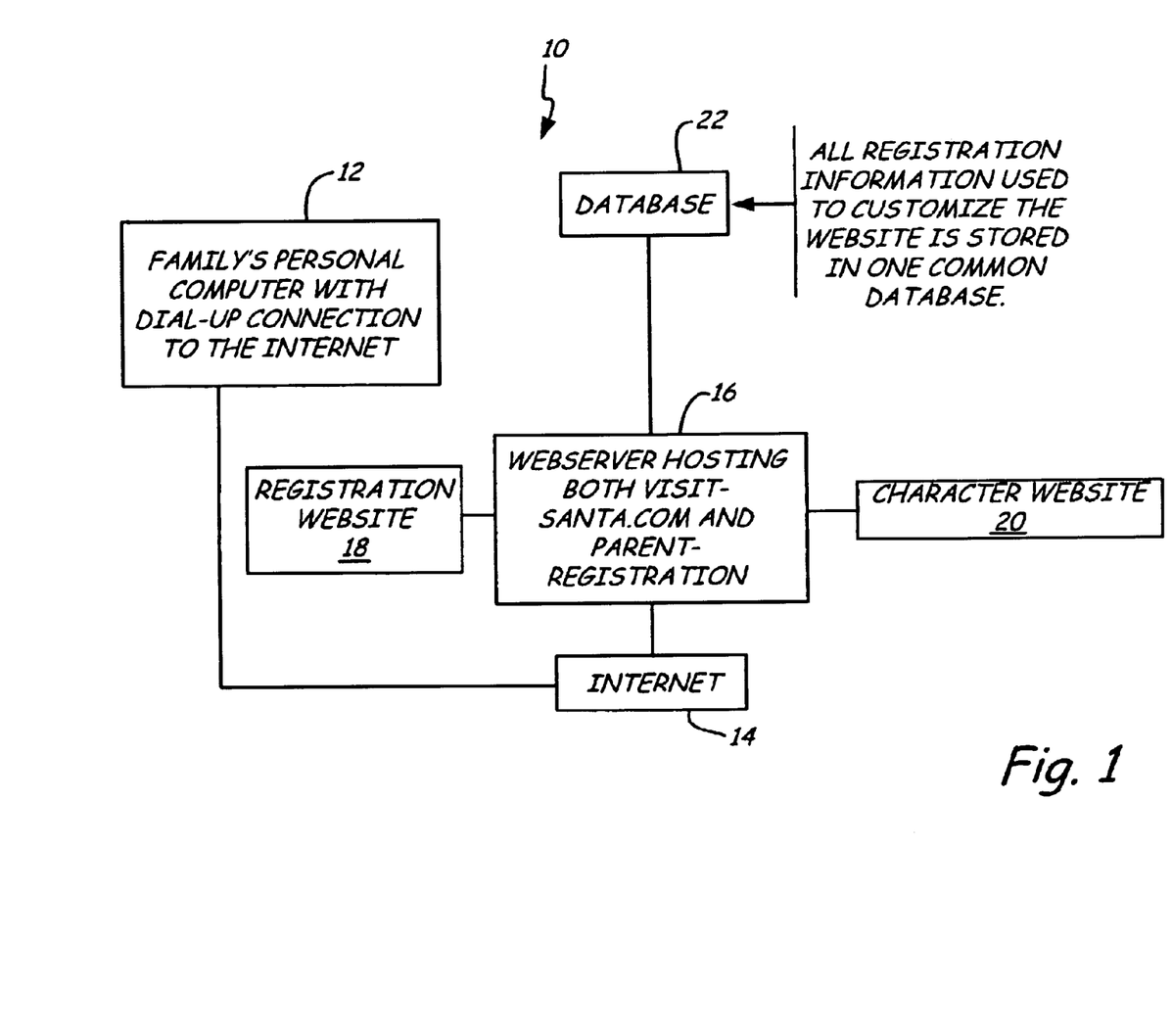
FIG. 1 is a block diagram depicting the relationship between a user's computer and a webserver that hosts a registration website and a character website of the present invention.

The system for character-child interaction with adult character control 10 of the present invention is depicted in FIG. 1. As shown, in the most basic form, system 10 generally comprises a user's computer 12, in this case a family's personal computer with dial-up access to the internet 14, and a character webserver 16, connected to the internet 14, which preferably host's a registration website 18 and a character website 20. Character webserver 16 incorporates a processor with a memory and/or storage device for storing the programs which control operation of registration website 18 and character website 20. Character webserver 16 communicates with a database 22 which stores individual user data.

I. System Overview

Figure 2:
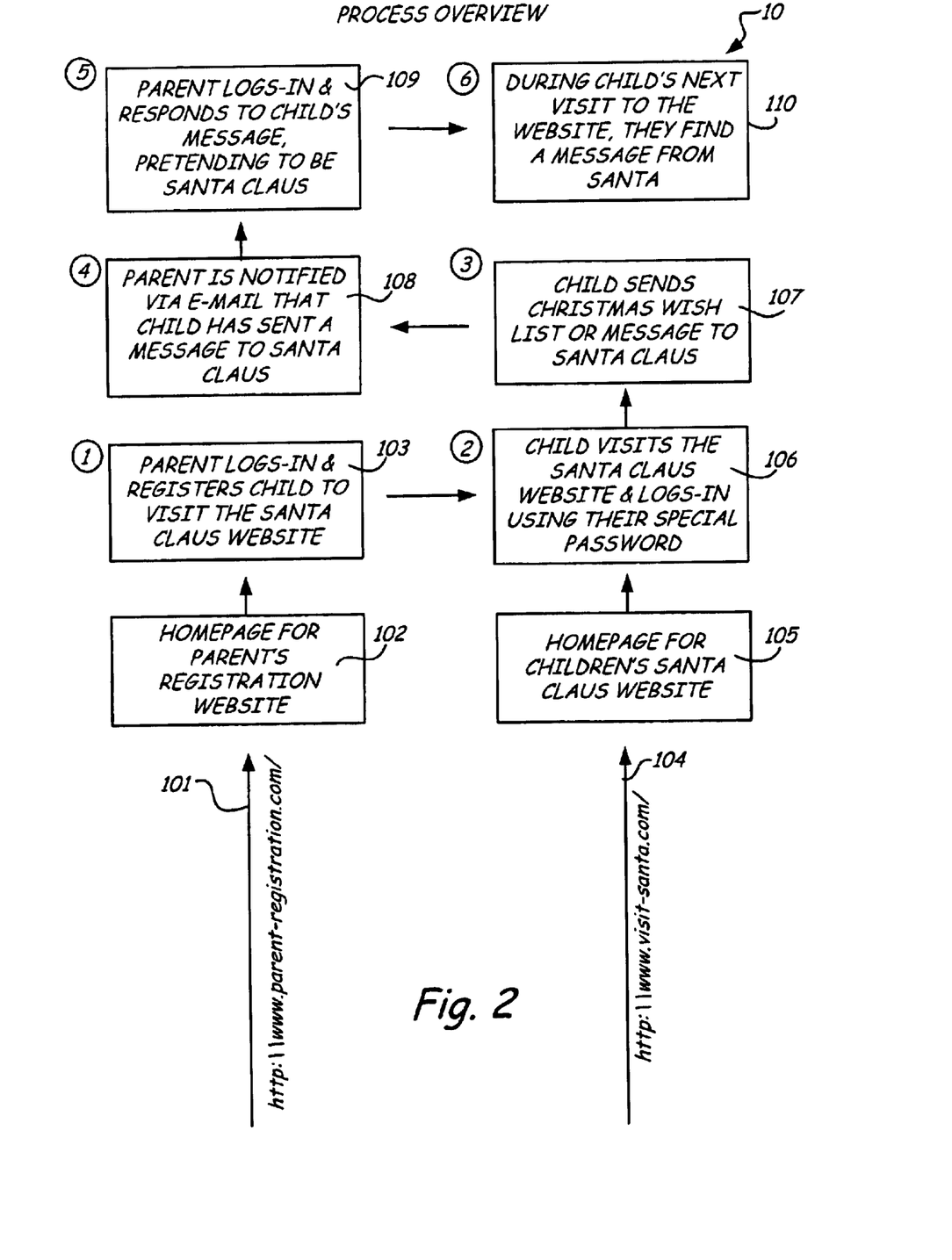
FIG. 2 is a block diagram depicting an overview of the operation of the system of the present invention; the interactions and relationships between the registration website and the character website are shown.

Referring to FIG. 2, a general overview of the operation of system 10 is presented. To initiate system 10 for operation, an adult user, e.g. a parent, must connect to the internet, indicated by arrow 101, and reach registration website 18 homepage, indicated by block 102, preferably by entering the registration website's address. Once reaching the home page of registration website 18, the adult user logs-in to the site and registers a child user to have access to character website 20, indicated by block 103.

With adult user log-in complete, the child user may connect to the internet, as indicated by arrow 104, and access character website 20, indicated by block 105. Note that in this instance, and throughout the remainder of the present application, the character referred to is Santa Claus, however, it should be noted that any other character identity may be used without departing from the spirit or scope of the invention. Once reaching the homepage of character website 20, the child user may log-in to character website 20, indicated by block 106. The child user may now submit messages and/or questions to the character, block 107.

Upon the child user submitting messages and/or questions to the character, the adult user is notified by e-mail of this action, block 108. At this point, the adult user accesses registration website 18 and responds to the child's message and/or question, as though they were the character, themselves, block 109. Upon the child's next visit to character website 20, the child is greeted with the character's response, block 110.

II.A. System Detail-Adult User Registration

Each of the blocks of FIG. 2 which make up system 10, will now be described in more detail with reference to flow charts and example web pages. Adult user log-in and registration, block 103 from FIG. 2, is depicted in detail in FIG. 3. As FIG. 3 indicates, the adult user has learned of system 10 via various forms of advertising or promotional materials and, upon learning of system 10, preferably calls a toll free number, or uses other appropriate data access methods, to obtain a unique password, block 200. Upon obtaining the password, the adult user visits the home page of registration website 18 wherein the adult is prompted to enter their unique password, block 202.

Figure 3:
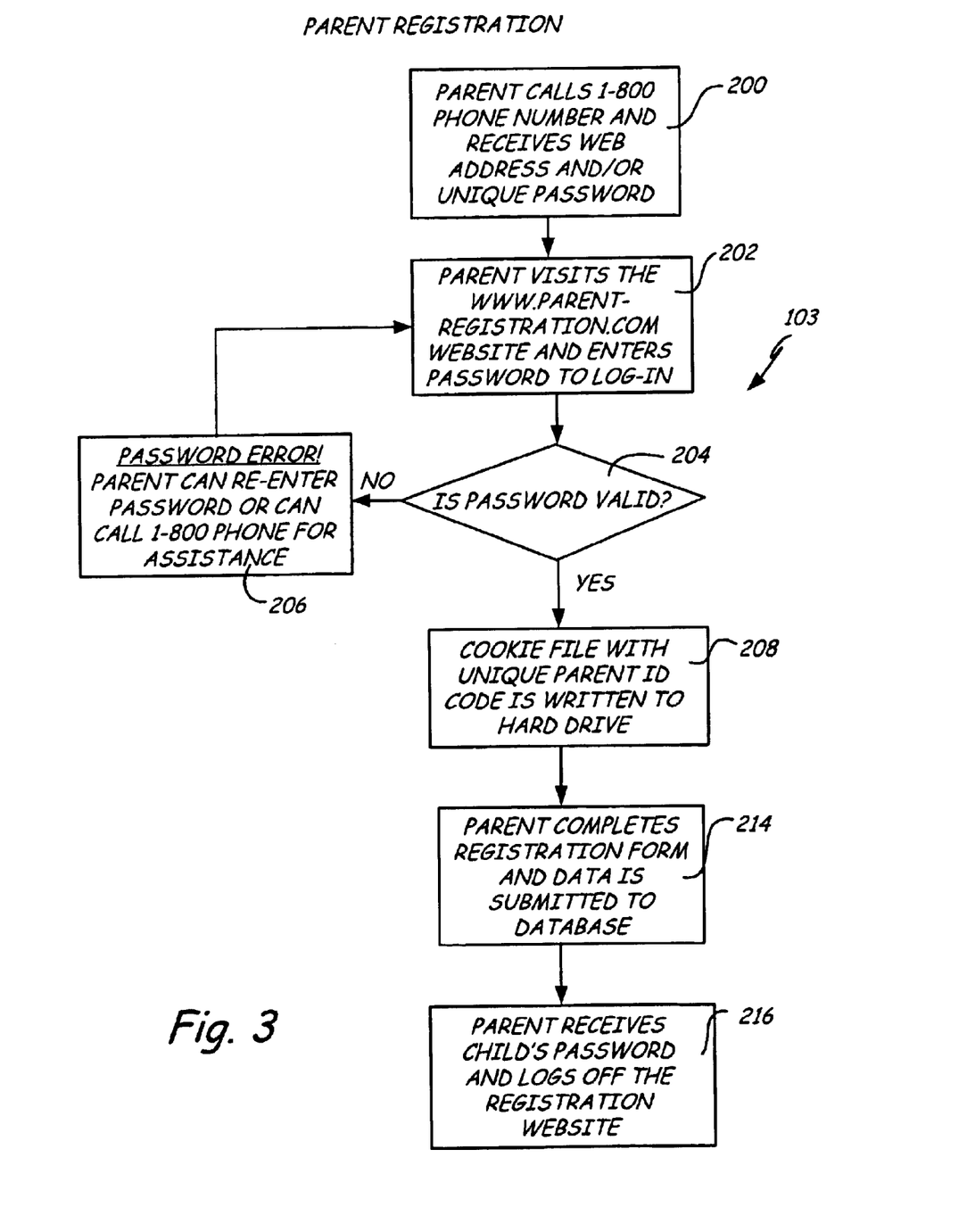
FIG. 3 is a flowchart depicting the process for adult user registration.

The password is submitted to webserver 16 utilizing a website application that compares the password against its database 22 to determine if the password is indeed valid, block 204. If the password is not valid, the adult user is notified of a password error, block 206 and returned to the home page of registration website 18 for re-entry of the password, block 202. The user may phone for assistance if necessary. If the password is valid, the adult registration process continues whereby the adult's password is indicated as "redeemed" within database 22 and a cookie file is written to the adult user's hard disk of their computer, block 208. The cookie file allows registration website 18 and character website 20 to identify the specific computer from which the adult user has enrolled.

Figure 4:
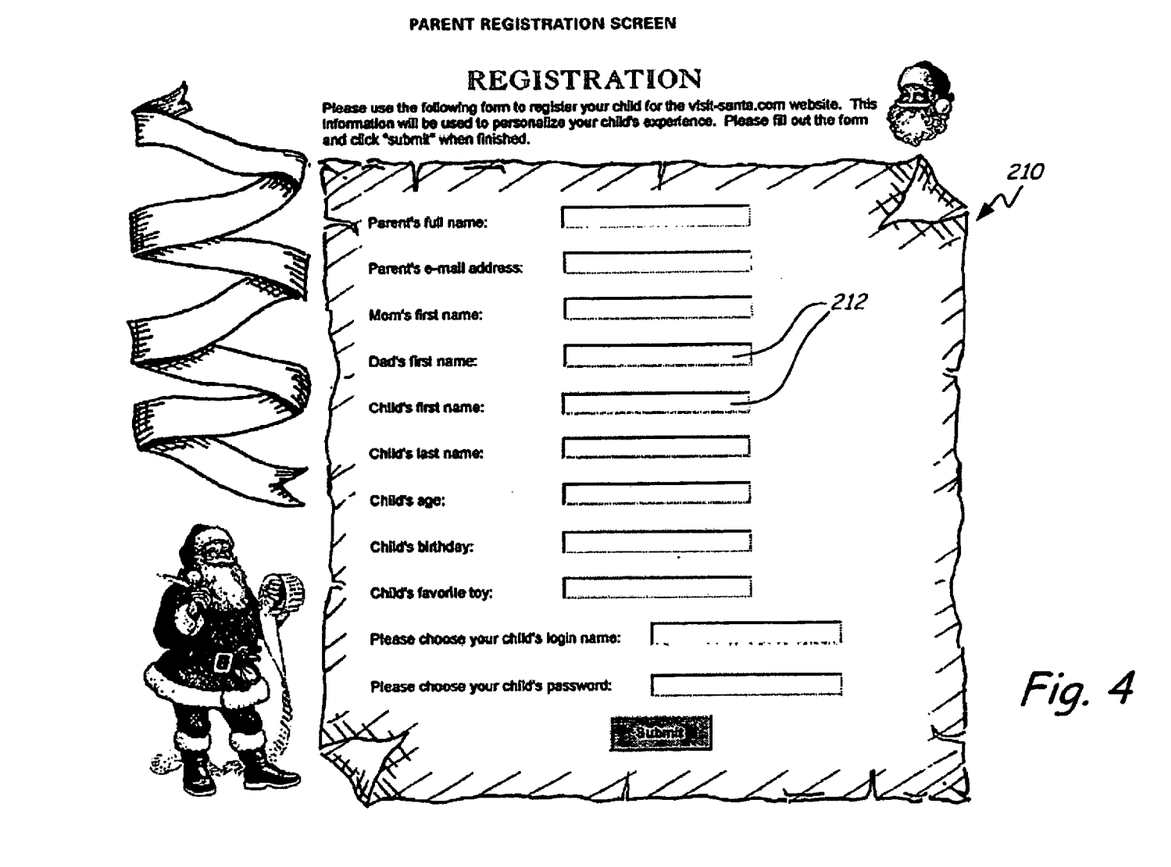
FIG. 4 is an example of a webpage that might be used for adult user registration.

Further, upon entering a valid password, the adult user is presented with a registration screen. A sample registration screen 210, presented by way of non-limiting example, is shown in FIG. 4 for the character of Santa Claus. Screen 210 provides numerous data fields 212 into which data may be entered about the adult user and about the future child user. Certain data fields are character specific, in other words are directly relevant to the interaction the character will have with the child user. In this case, the data field of the child's favorite toy is especially relevant to the Santa Claus character. In this specific character registration screen, the adult user is requested to enter the parent's full name, the parent's e-mail address, the mother's first name, the father's first name, the child's first name, the child's last name, the child's age, the child's birthday, the child's favorite toy, the child's login name and the child's password. Of course, additional and/or other questions, e.g. siblings' names, pets' names, friends' names, grandparents' names, special interests, may be entered to additionally customize the child user's experience, without departing from the spirit or the scope of the invention. All data entered is stored in database 22.

Referring once again to FIG. 3, upon completing the registration screen, the adult user submits the entered data to webserver 18 wherein all data entered is stored in database 22, block 214. After submission of the data, webserver 16 returns a child's login and password or verification of a previously entered child's login and password. The adult user is then prompted to enter a login identification and password. The adult user's login and password are also stored in database 22. The adult user's login and password may be used by the adult user to re-visit registration website 18 to update the registration data and/or respond to the child user's messages and/or questions.

II.B. System Detail—Child User Log-in and Use

Figure 5:
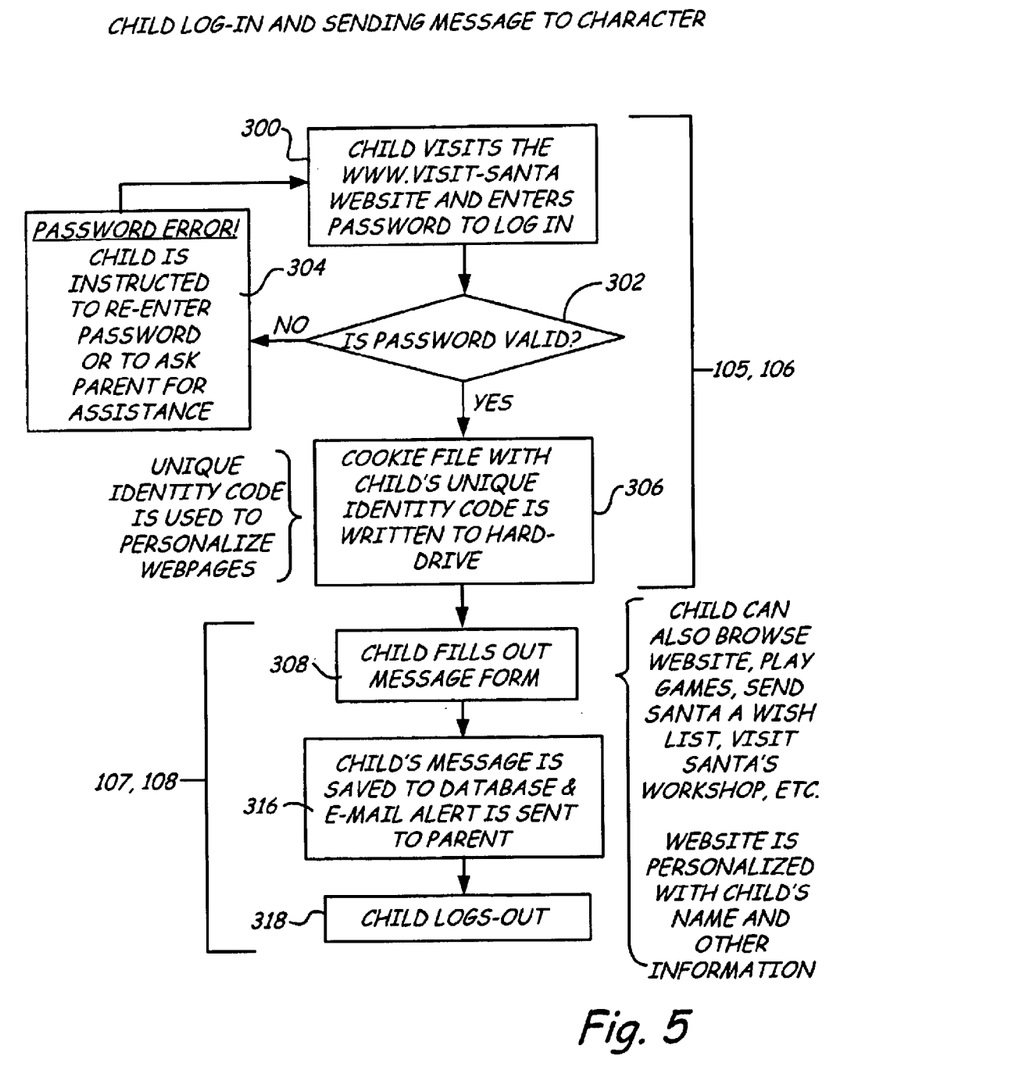
FIG. 5 is a flowchart depicting child user log-in to the character website and the submission of questions to the character website.

With adult registration now complete, the child user may login to character website 20. FIG. 5 provides an overview of how the child user interacts with character website 20 in flowchart format, and provides the details behind blocks 105, 106, 107, and 108 of FIG. 2. Referring now to FIG. 5, block 300, the child user is preferably aided by the adult user in accessing the character website 20 via their computer 12 by entering the website address. Upon reaching character website 20, the child user is prompted for their login name and password. The login name and password are then submitted to webserver 16 which accesses database 22 (database 22 is shared by registration website 18 and character website 20) to verify that the child user s login name and password are indeed valid, block 302. If the child user's login name and/or password are not valid, the child user is notified of the error and notified to ask for adult assistance, block 304. They are then returned to the log-in screen and prompted to re-enter their log-in and password, block 300.

If the child user's login and password are valid, a cookie file is written to the child user computer's hard drive, block 306. This cookie file stores information about the child user that is used to personalize each character website page that they visit and is also preferably used to provide security. Specifically, without a valid cookie file, no other user may see any of the child user's personalized pages nor any of the child user's messages from the character.

Further, with a valid login and password, the child user may enter any of the pages of character website, each of which will greet the child user with their name and other appropriate personalized data as retrieved from database 22. Each character website is preferably specific and relevant to the character providing at least one page where the child user may enter a message or ask a question of the character, block 308. Other character website pages are also preferably included. For example, with reference to a Santa Claus character website, game pages, wish list pages, and pages providing a tour of Santa's workshop are preferably included. Numerous types of personalized character website pages may be included without departing from the spirit or scope of the invention.

Figure 6:
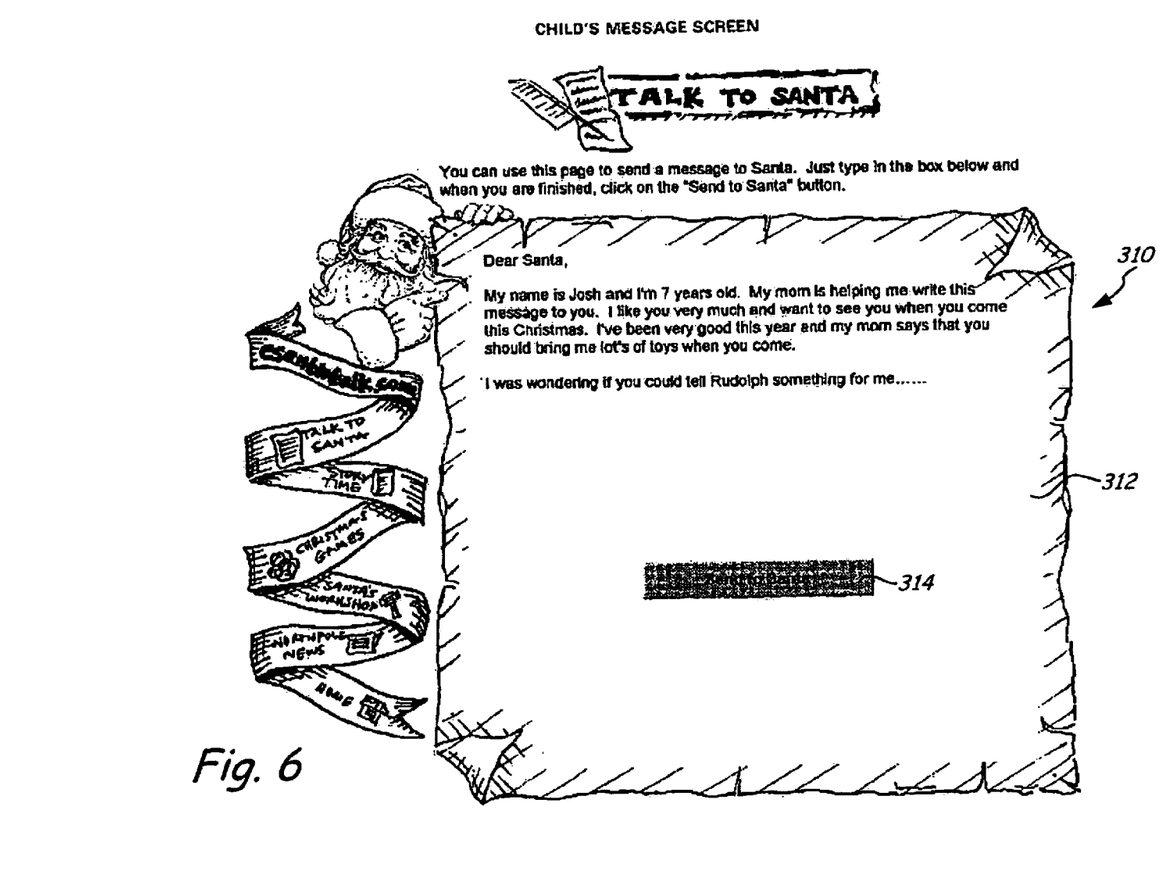
FIG. 6 is an example of a webpage that might be used for child user questions.

FIG. 6 provides a specific sample screen, by way of non-limiting example, of a character website message page 310, in this case a Santa Claus message screen. Message screen 310 provides a blank box into which a typed message may be entered. A submission button 314 is provided for sending the message to the character. Referring once again to FIG. 5 and block 316, upon submission of the child user's message, the message is saved to database 22 and an e-mail alert that the child user has sent a message to a character is sent to the adult user. The e-mail address is obtained from the data stored in database 22. Upon submitting their message, the child user may logout of, or otherwise exit, character website 18, block 318. Of course, the child user is not required to submit a message but rather may just play at accessing their personalized website pages.

II.C. System Detail—Adult User Response to Child User Message

Figure 7:
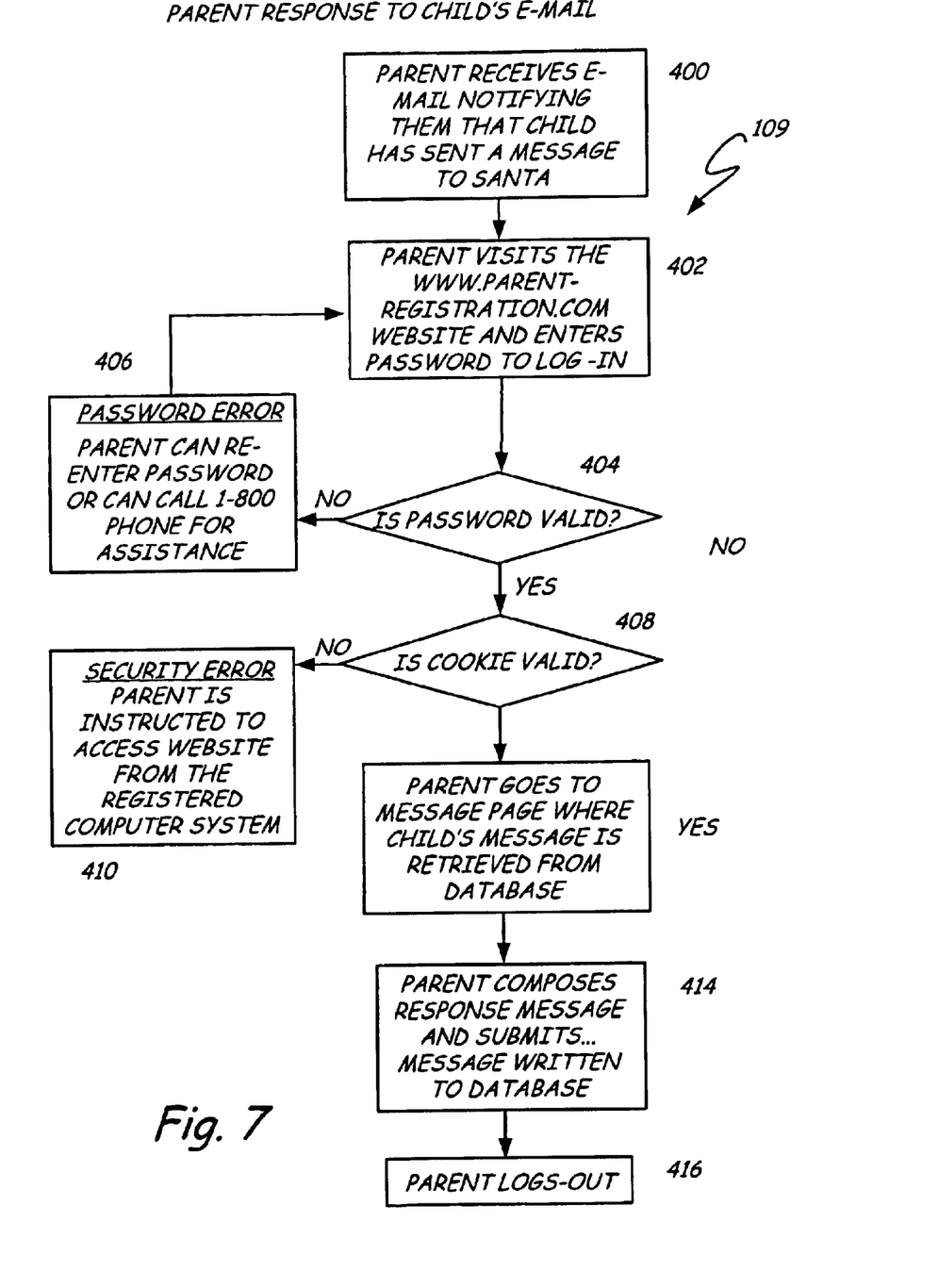
FIG. 7 is a flowchart depicting how an adult user may respond to the questions submitted by a child user to the website character.

With the child user's message and/or questions submitted to the character, the adult user is notified via e-mail of the message submission. FIG. 7 provides an overview of how the adult user interacts with registration website 20 in flowchart format to respond to the child user's message submission, and provides the details behind block 109 of FIG. 2. Referring now to FIG. 7, block 400, the adult user receives e-mail notification that the child user has sent a message to a character.

In response to notification, the adult user accesses the internet and enters the address for the registration website 18 wherein the adult user is prompted to enter their login and password, block 402. Upon submission of the adult user's login and password to webserver 16, webserver 16 accesses database 22 and compares the login and password against valid login and passwords, block 404. If the login and/or password are not valid, the adult user is preferably notified of the error and that they may call for assistance, block 406, then returned to login screen for re-entry of login and password, block 402.

If the login and password are valid, the website application running on character webserver 16 verifies the cookie file on the adult user's hard drive to ensure that the adult user is entering registration website 18 from the same computer from which initial adult user registration was completed, block 408. If the cookie file of the present computer does not match the stored information of the cookie file from the original computer, access to registration website 18 is denied and the adult user is informed that they are only allowed entry from the computer from which adult user registration took place, block 410. As such, even if a stranger were to find the adult user's login and password, they would be denied access to registration website 18 unless entering the website from the original registration computer; this feature of system 10 provides an additional security level.

If the login and password are valid, and, as well, the adult user has entered from the original registration computer, i.e. cookie files match, the adult user is granted entry to registration website 18 and directed to a message display page wherein the child user's message, as correlated to the adult user's login and password, is retrieved from database 22 and displayed to the adult user, block 412. The adult user may then type a response to the child user's message and/or questions, preferably responding in a manner consistent with the character. The adult user then submits their response whereby it is written to database 22 and stored for later display to the child user, block 414. The adult user then preferably logs out, or otherwise exits, registration website 18, block 416.

It should be noted that if the child user has an e-mail address, the adult user may choose to e-mail the response to the child user, the e-mail sent is identified with a character's e-mail address, provided by the website application, rather than the adult user's personal address to maintain the adult user's anonymity and upkeep the character facade.

II.D. System Detail—Child User Retrieving Adult User Response

Figure 8:
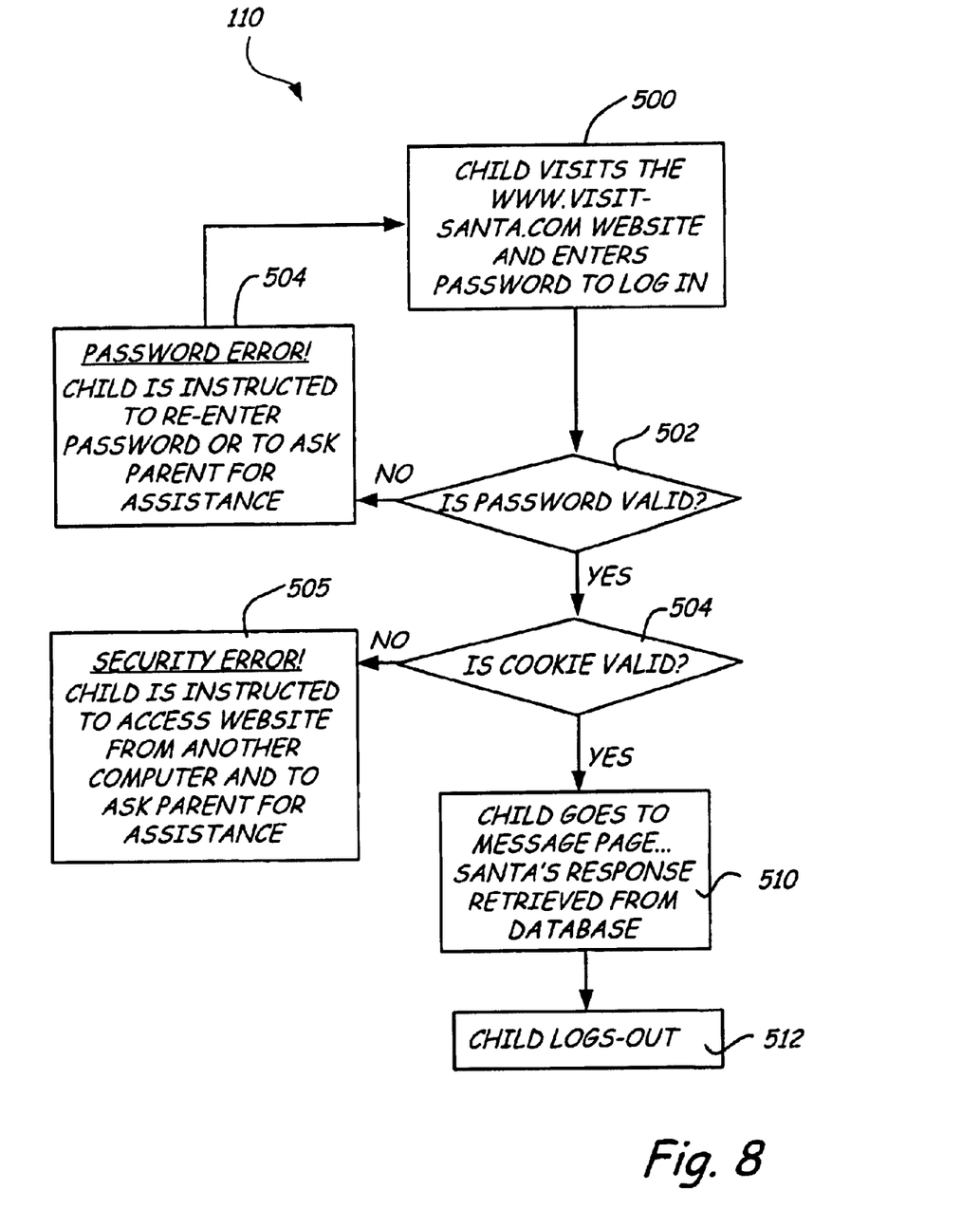
FIG. 8 is a flowchart depicting how the child may retrieve answers/messages from the character website.

With the adult user's response submitted and stored, the child user may once again log onto to the character website 20 and obtain the responses. FIG. 8 provides an overview of how the child user may retrieve the submitted responses in flowchart format, and provides the details behind block 110 of FIG. 2. Referring now to FIG. 8, block 500, the child user once again obtains access to the internet via their computer and enters the address of character website 20. Upon arriving at the home page of character web site 20, the child user is prompted to enter their login and password. Once submitted the login and password are compared with stored logins and passwords in database 22 to determine their validity, block 502. If the login and/or password are not valid, the child user is notified of an error and notified that they should ask for adult assistance, block 504. The child user is then returned to the login screen and prompted to re-enter their login and password, block 500.

If the login and password are valid, the website application running on character webserver 16 verifies the cookie file on the child user's hard drive to ensure that the child user is entering character website 20 from the same computer from which initial child user log-in was complete, block 504. If the cookie file of the present computer does not match the stored information of the cookie file from the original computer, access to character website 20 is denied and the child user is informed that they need to access character website from their original log-in computer and that they should ask for adult assistance. As such, even if a stranger were to find the child user's log-in and password, they would be denied access to character website 20 unless entering the website from the original child user log-in computer; this feature of system 10 provides an additional security level similar to that provided for adult user's.

Figure 9:
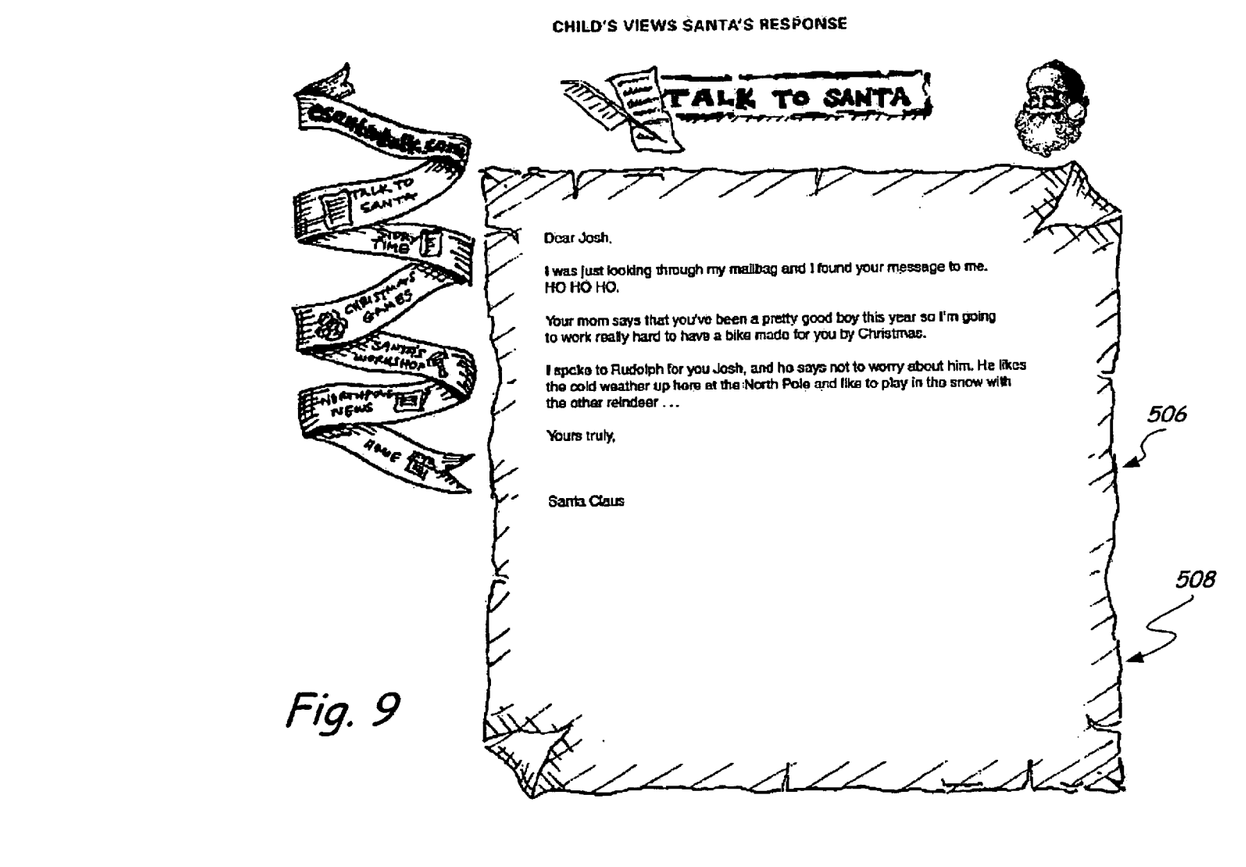
FIG. 9 is an example of a web page that might be used to retrieve answers/messages from the character.

If the login and password are valid, and, as well, the child user has entered from their initial log-in computer, i.e. cookie files match, the child user is granted access to character web site 20 where they may once again go through the various website pages which have been personalized to the child user based on the information stored in database 22. Specifically, the child may go to the message response page of character website 20 where they find the response to their message/questions that they had submitted earlier, block 506. FIG. 9 depicts a sample message response page 506, provided by way of non-limiting example, wherein the adult user, posing as the character Santa Claus, has submitted a response for the child to read. The message is posted within a blank box 508 area. Returning now to FIG. 8 and block 510, the child user may now submit a new message and/or questions and the cycle continues by notifying the adult user by e-mail. Once finished with their activities on character website 18, the child user may logoff, or otherwise exit, the website, block 512.

III. Expanded System

Figure 10:
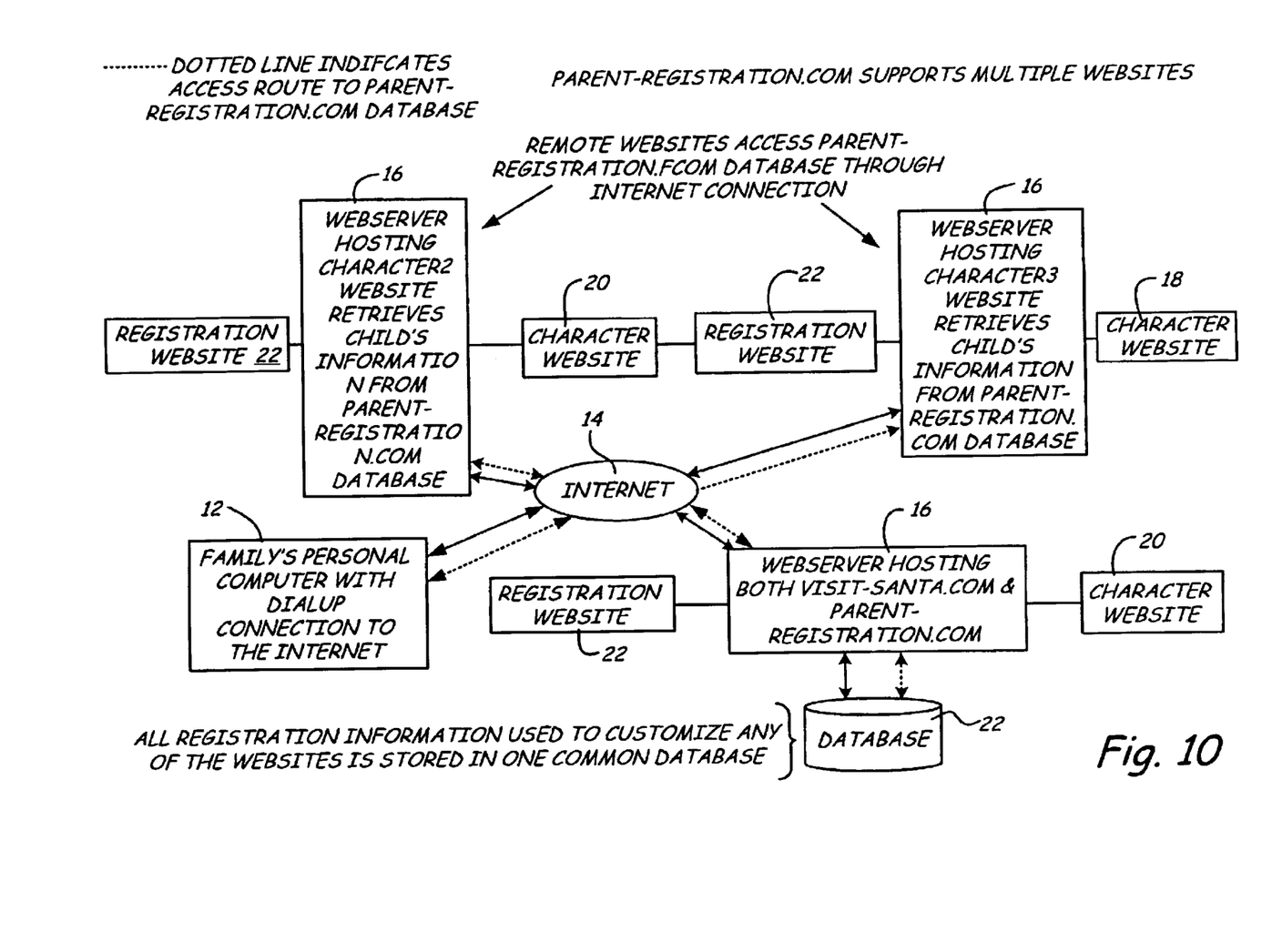
FIG. 10 is a block diagram showing an expanded system of the present invention incorporating a plurality of character webservers.

The above system 10 has been described with reference to a single character site, with, of course, the possibility of many adult users and child users accessing the single character registration site 18 and character site 20, respectively. However, system 10 may be expanded to include numerous characters. Referring to FIG. 10, a character expanded system 10 is depicted. In character expanded system 10, the adult user preferably uses their personal computer 12 to access the internet 14 and enters the address for registration website 18. Upon reaching webserver 16 and registration website 18, the adult user is prompted to enter all pertinent information, as described earlier above, and is preferably provided with the option of selecting a plurality of character webservers 16, each having their own registration website 18 and character website 20 to which their child or children may have access. Note that while each character webserver 16 has a registration website 18, the adult user need not register individually at each registration website 18 if more than one character website is desired. Rather, registering at a single registration website 18 and therein selecting additional character websites completes registration for all desired character websites 20. This is due to the circumstance that each of character webservers 16 share or have access to database 22 whereby they may obtain all personalized data entered by the adult user.

As such, the child user's personalized information is presentable on all character websites that the adult user has selected. Preferably, the child user is provided with a single login and password that works on all adult user selected character websites 18.

Further, the above system 10 has been described with reference to a fanciful character such as Santa Claus. However, it should be noted that any type of character may be used, the point is to maintain adult anonymity while allowing the adult user to substantially maintain control over what internet information their child has access to. It should further be noted that the character need not be a "fun" character but may be a tutor, providing the child user with hints on their homework and helping them through educational games. The character might be utilized with online puzzles or games wherein the child user may submit questions to obtain hints, clues, or strategies in solving a puzzle. Another application for system 10 is that of a pen-pal, wherein the child user corresponds with an imaginary friend or a storybook character.

Moreover, while the above system 10 has been described with respect to an adult user as registrant and a child user as the character interactor, system 10 may be used between two adults or two children without departing from the spirit or scope of the invention.

The present invention may be embodied in other specific forms without departing from the essential attributes thereof; therefore, the illustrated embodiments should be considered in all respects as illustrative and not restrictive, reference being made to the appended claims rather than to the foregoing description to indicate the scope of the invention.

What is claimed:

1. A system for allowing a first, adult-controlled user interface to interact in the manner of a character facade with a second, child-controlled user interface via a computer, comprising:
    a storage device; and
    a processor connected to said storage device;
    said storage device storing a program for controlling said processor; and
    said processor operative with said program to:
        receive a message from said second, child-controlled user interface;
        notify, by electronic mail, said first, adult-controlled user interface of the received message;
        receive a reply to said received message from said first, adult-controlled user interface; and
        present said reply to said second, child-controlled user interface in the manner of a child-identifiable, fictional character facade; wherein said first, adult-controlled user interface provides said reply and wherein said second, child-controlled user interface sees said reply as coming only from said child-identifiable fictional character.

2. The system of claim 1 wherein said processor operative with said program to receive personal data from an adult user through said first, adult-controlled user interface about a child user of said second, child-controlled user interface.

3. The system of claim 2, wherein said processor operative with said program to present at least a portion of said personal data to said child user of said second child-controlled user interface in said manner of said child-identifiable character facade.

4. The system of claim 1, wherein said processor operative with said program to verify that an adult user of said first, adult-controlled user interface should have access to said program.

5. The system of claim 4, wherein the verification occurs by comparing a first user-entered password with a stored password.

6. The system of claim 5, wherein the verification occurs by comparing a first user's cookie file with a stored file.

7. The system of claim 1, wherein said processor operative with said program to verify that said second, child-controlled user interface should have access to said program.

8. The system of claim 7, wherein the verification occurs by comparing a second user-entered password with a stored password.

9. A method for using a computer to facilitate the interaction of a first, adult-controlled user interface with a second, child-controlled user interface in the manner of a character facade, comprising the steps of:
    said second, child-controlled user interface providing a message to said computer;
    said computer notifying said first, adult-controlled user interface of the provided message by electronic mail;
    said first, adult-controlled user interface providing a reply to said message to said computer in the manner of a child-identifiable, fictional character facade; and
    said computer displaying said reply through said second, child-controlled user interface in the manner of said child-identifiable, fictional character facade, wherein said second, child-controlled user interface sees said reply as coming only from the fictional character.

10. The method of claim 9, further comprising the step of said first, adult-controlled user interface providing personal data about a child user of said second, child-controlled user interface to said computer.

11. The method of claim 10, further comprising the step of said computer displaying at least a portion of said personal data to said child user of said second, child-controlled user interface in the manner of said child-identifiable character facade.

12. The method of claim 9, further comprising the step of said computer verifying that an adult user of said first, adult-controlled user interface should have access to said computer.

13. The method of claim 12, wherein said step of said computer verifying comprises comparing a first user-entered password with a stored password.

14. The method of claim 13, wherein said step of said computer verifying comprises comparing a first user cookie file with a stored file.

15. The method of claim 9, further comprising the step of said computer verifying that a child user of said second, child-controlled user interface should have access to said computer.

16. The method of claim 15, wherein said step of said computer verifying comprises comparing a second-user entered password with a stored password.

17. A system for allowing a first, adult-controlled user interface to interact in the manner of a character facade with a second, child-controlled user interface via a computer, comprising:
  storage means for storing data and for storing a program means; and
  processor means for processing data, said processor means connected to said storage means;
  said program means for controlling said processor means, said processor means operative with said programming means for:
    receiving a message from said second, child-controlled user interface;
    notifying, by electronic mail, said first, adult-controlled user interface of the received message;
    receiving a reply to said received message from said first, adult-controlled user interface; and
    presenting said reply to said second, child-controlled user interface in the manner of a child-identifiable, fictional character facade, wherein said second child-controlled user interface sees said reply as coming only from the fictional character.

18. The system of claim 17, wherein said processor means operative with said programming means for receiving personal data from said first, adult-controlled user interface about a child user of said second, child-controlled user interface.

19. The system of claim 18, wherein said processor means operative with said programming means for presenting at least a portion of said personal data to said child user of said second, child-controlled user interface in said manner of said child-identifiable, character facade.

20. The system of claim 17, wherein said processor means operative with said programming means for verifying that an adult user of said first, child-controlled user interface should have access to said programming means.

21. The system of claim 20, wherein the verification occurs by comparing a first user-entered password with a stored password.

22. The system of claim 20, wherein the verification occurs by comparing a first user's cookie file with a stored file.

23. The system of claim 17, wherein said processor means operative with said programming means for verifying that a child user of said second, child-controlled user interface should have access to said programming means.

24. The system of claim 23, wherein the verification occurs by comparing a second user-entered password with a stored password.

* * * * *